United States Patent
Mansour (10) Patent No.: US 11,879,487 B1
(45) Date of Patent: Jan. 23, 2024

(54) SELF-TAPPING FASTENER

(71) Applicant: Ryan Mansour, West Palm Beach, FL (US)

(72) Inventor: Ryan Mansour, West Palm Beach, FL (US)

( * ) Notice: Subject to any disclaimer, the term of this patent is extended or adjusted under 35 U.S.C. 154(b) by 357 days.

(21) Appl. No.: 17/114,736

(22) Filed: Dec. 8, 2020

Related U.S. Application Data (60) Provisional application No. 62/946,552, filed on Dec. 11, 2019.

(51) Int. Cl.
*F16B 25/10* (2006.01)
*F16B 25/00* (2006.01)

(52) U.S. Cl.
CPC ........ *F16B 25/103* (2013.01); *F16B 25/0084* (2013.01)

(58) Field of Classification Search
CPC .............. F16B 25/103; F16B 25/0084; F16B 25/0031; F16B 25/106; F16B 25/0015; F16B 25/10; F16B 25/0047; F16B 25/0078; F16B 35/00; F16B 39/30
USPC .......... 411/211, 227, 382, 386, 387.1, 387.4, 411/387.5, 387.6, 387.8, 411, 426, 489
See application file for complete search history.

(56) References Cited

U.S. PATENT DOCUMENTS

| | | | |
|---|---|---|---|
| 1,933,332 A | 10/1933 | May | |
| 2,959,086 A | 11/1960 | Gerlach et al. | |
| 3,318,182 A | 5/1967 | Carlson | |
| 3,426,642 A | 2/1969 | Phipard, Jr. | |
| 3,726,330 A | 4/1973 | Adler | |
| 4,621,963 A * | 11/1986 | Reinwall | F16B 5/0275 411/386 |
| 5,205,466 A | 4/1993 | Ker | |
| 5,755,542 A | 5/1998 | Janusz et al. | |
| 6,053,653 A * | 4/2000 | Tanaka | F16B 5/0275 411/413 |
| 6,158,939 A | 12/2000 | Grossberndt et al. | |
| 6,595,733 B1 | 7/2003 | Willert | |
| D482,957 S | 12/2003 | Lajeunesse et al. | |
| 6,966,737 B2 | 11/2005 | McGovern et al. | |
| 7,160,630 B2 | 1/2007 | Klos | |
| 7,165,925 B2 | 1/2007 | Unsworth et al. | |
| 7,179,036 B2 | 2/2007 | Griffin et al. | |
| 7,214,019 B2 | 5/2007 | Palm | |
| 7,293,947 B2 | 11/2007 | Craven | |
| 7,677,854 B2 | 3/2010 | Langewiesche | |
| 7,682,118 B2 | 3/2010 | Gong et al. | |
| D646,152 S | 10/2011 | Shinjo | |
| 8,052,363 B2 | 11/2011 | Palm | |
| 8,398,350 B2 | 3/2013 | Ishida et al. | |

(Continued)

*Primary Examiner* — Victor D Batson
*Assistant Examiner* — Carl J Carlson
(74) *Attorney, Agent, or Firm* — John Rizvi; John Rizvi, P.A.—The Patent Professor®

(57) ABSTRACT

A self-tapping fastener or screw is provided including a head, a cutting tip, and a body portion. The cutting tip includes a first cutting surface. The body portion extends from the head along a central axis to the cutting tip. The body portion includes a proximal threaded portion having a proximal thread size; a distal threaded portion having a distal thread size, the distal thread size being smaller than the proximal thread size; and an intermediate portion, the intermediate portion of the body portion disposed between the proximal threaded portion and the distal threaded portion.

17 Claims, 9 Drawing Sheets

(56) References Cited

U.S. PATENT DOCUMENTS

| | | | |
|---|---|---|---|
| 8,419,332 B2 * | 4/2013 | Kochheiser | F16B 5/0275 411/426 |
| 8,920,093 B2 | 12/2014 | Hettich | |
| 9,016,995 B1 * | 4/2015 | Janowicz, Sr. | F16B 35/065 411/399 |
| 9,115,746 B2 * | 8/2015 | Mair | F16B 5/0275 |
| 2006/0235415 A1 | 10/2006 | Loi et al. | |
| 2014/0335345 A1 | 11/2014 | Ambros | |
| 2015/0176623 A1 | 6/2015 | Vogel et al. | |
| 2018/0298934 A1 | 10/2018 | Eckert et al. | |

\* cited by examiner

FIG. 10

SELF-TAPPING FASTENER

CROSS-REFERENCE TO RELATED APPLICATIONS

This application claims the benefit of U.S. Provisional Patent Application No. 62/946,552, filed on Dec. 11, 2019, which is incorporated herein by reference in its entirety.

FIELD OF THE INVENTION

The present invention relates generally to fasteners, and more particularly, to a self-tapping fastener or screw including multiple thread sizes and/or multiple cutting surfaces.

BACKGROUND OF THE INVENTION

Conventional fasteners, such as screws and/or bolts, may produce a hole or cavity in a structure that is larger than desirable. For example, a bolt having a certain size may be used to fasten a structure to another structure; with time, the bolt may become rusted and/or may deteriorate the receiving cavity. This may be problematic particularly for replacement of the structure, as the bolt may no longer be able to tightly and securely thread into the receiving cavity. Typically, in order to accommodate for the deterioration of the receiving cavity, a larger screw may be used to ensure that the new screw will be able to fasten the new structure even with the deteriorated receiving cavity. Unfortunately, in some scenarios a larger screw size may not be commercially available or may not be otherwise readily accessible. For example, a #14 bolt is typically used to fasten a screen to a screened-in porch; however, screws having a diameter larger than a diameter of a #14 bolt are generally not readily available.

Other known techniques for fastening a structure to a deteriorated receiving cavity include, for example, screw repairing kits, or filling the cavity with filler which then solidifies and allows to redrive the screw. However, in practice, these techniques are lacking. For example, screw repairing kits may not be suitable for many fastening scenarios and can also be fairly expensive. In addition, filling the cavity and redriving the screw may involve several time-consuming steps and the purchase of additional materials, which can result in an increase in the complexity and cost of the replacement.

When fastening structures to one another, additional or alternative problems may be encountered. For example, in the event that both structures are provided with holes or cavities through which a same fastener must extend, it is often difficult to precisely align the cavities while inserting the fastener therethrough. Another common problem is that it may be difficult to thread a fastener into a structure lacking a fastener-receiving cavity, and to maintain the structure in place while the fastener self-taps into the structure and forms a cavity therethrough.

Accordingly, there is an established need for a solution to at least one of the aforementioned problems. Furthermore, it would be desirable that a same fastener could solve more than one of the aforementioned problems, and most desirably, all of the aforementioned problems.

SUMMARY OF THE INVENTION

The present invention is directed to a fastener that is capable of accommodating a hole or cavity having a diameter that is larger than desirable, such as, a deteriorated/worn-out receiving cavity. Alternatively or additionally, the fastener can help form a cavity in a structure lacking a fastener-receiving cavity. Alternatively or additionally, the fastener may help align fastener-receiving cavities provided in two structures to be connected to one another by the fastener. In some embodiments of the invention, a same fastener in accordance with the present disclosure may provide more than one of these advantageous effects or functionalities. In some preferred embodiments of the invention, a same fastener in accordance with the present disclosure may provide all of said advantageous effects or functionalities.

In a first implementation of the invention, a self-tapping screw includes:
  a head;
  a cutting tip, the cutting tip including a first cutting surface; and
  a body portion, the body portion extending from the head along a central axis to the cutting tip and the body portion including:
    a proximal threaded portion having a proximal thread size;
    a distal threaded portion having a distal thread size, the distal thread size being smaller than the proximal thread size; and
    an intermediate portion, the intermediate portion of the body portion disposed between the proximal threaded portion and the distal threaded portion.

In a second aspect of the self-tapping screw, the distal threaded portion includes a major diameter that is less than a major diameter of the proximal threaded portion.

In another aspect, the distal thread size of the distal threaded portion corresponds to a #14 thread size.

In another aspect, a length of the distal threaded portion is shorter than a length of the proximal threaded portion.

In another aspect, a length of the distal threaded portion is in a range between 0.125 and 0.375 inches.

In yet another aspect, the proximal thread size of the proximal threaded portion corresponds to one of a #16 thread size and a #18 thread size.

In another aspect, the proximal threaded portion is disposed between the head and the intermediate portion of the body portion.

In another aspect, the first cutting surface of the cutting tip is a self-tapping surface.

In another aspect, the intermediate portion of the body portion is a self-tapping surface.

In yet another aspect, the first cutting surface of the cutting tip is a tapered cutting surface.

In another aspect, the intermediate portion of the body portion is a tapered cutting surface.

In another aspect, the head is sized and configured to receive a torque-applying tool.

In another aspect, the self-tapping screw is comprised of a stainless-steel material.

In another implementation of the invention, a self-tapping fastener may include a head, a body portion, and a cutting tip. The head may be configured to allow a torque-applying tool to apply a torque on the head to drive the self-tapping fastener for rotation. The body portion may be arranged distally of the head and elongately formed along a longitudinal direction. The body portion may include a proximal threaded portion having a first diameter, an intermediate portion, disposed distally of the proximal threaded portion, the intermediate portion comprising at least one cutting surface, and a distal threaded portion disposed distally of the intermediate portion, the distal threaded portion having a second diameter, the second diameter being smaller than the first diameter. The cutting tip may be arranged distally of the body portion and may include at least one cutting surface.

In another aspect, the intermediate portion may be non-threaded.

In another aspect, the proximal threaded portion of the body portion may be a cylindrical threaded portion.

In another aspect, the distal threaded portion of the body portion may be a cylindrical threaded portion.

In another aspect, the intermediate portion may be conical.

In yet another aspect, the body portion may extend from a distal end of the head.

In another aspect, the proximal threaded portion of the body portion may extend from the distal end of the head.

In another aspect, the intermediate portion may extend from a distal end of the proximal threaded portion.

In another aspect, the intermediate portion may extend to a proximal end of the distal threaded portion.

In yet another aspect, the cutting tip may extend from a distal end of the body portion.

In another aspect, the cutting tip may extend from a distal end of the distal threaded portion of the body portion.

In another aspect, the cutting tip may be conical.

In another aspect, the cutting tip may be a drilling tip.

In yet another aspect, the proximal threaded portion may have a proximal thread size, and the distal threaded portion may have a distal thread size which may be smaller than the proximal thread size.

In another aspect, the proximal threaded portion may be longer than the distal threaded portion, i.e. may have a dimension along the longitudinal direction which is greater than a dimension of the distal threaded portion along the longitudinal direction.

In another aspect, the proximal threaded portion may be longer than the intermediate portion, i.e. may have a dimension along the longitudinal direction which is greater than a dimension of the intermediate portion along the longitudinal direction.

In another aspect, the intermediate portion may be shorted than the distal threaded portion, i.e. may have a dimension along the longitudinal direction which is less than a dimension of the distal threaded portion along the longitudinal direction.

In yet another aspect, the head may include an integrated washer.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and efficient self-tapping screw having multiple threaded portions and cutting surfaces and that may be used to attach a first structure (e.g., shutter) to a second structure (e.g., wall). In some embodiments, the self-tapping screw 110 may be called a "fix-it" screw. In one preferred embodiment, the self-tapping screw includes at least one narrow threaded portion having a smaller diameter than another, wider threaded portion. A narrow cutting tip or tip portion extending from the narrow threaded portion may be capable of penetrating a pre-existing narrow cavity within the first structure to align the pre-existing narrow cavity to a second hole in the second structure. A wider cutting surface extending from the wider threaded portion is then able to thread into the second hole in the second structure and further thread tightly into the pre-existing narrow cavity to form a wider threaded cavity than the original, pre-existing narrow cavity size. Thus, in the preferred embodiment, the self-tapping screw may be capable of tightly attaching to a wall surface defining a cavity that has a diameter that is smaller than a diameter of the wider threaded portion of the self-tapping screw to, for example, accommodate for a worn-out threaded cavity.

Figure 1:
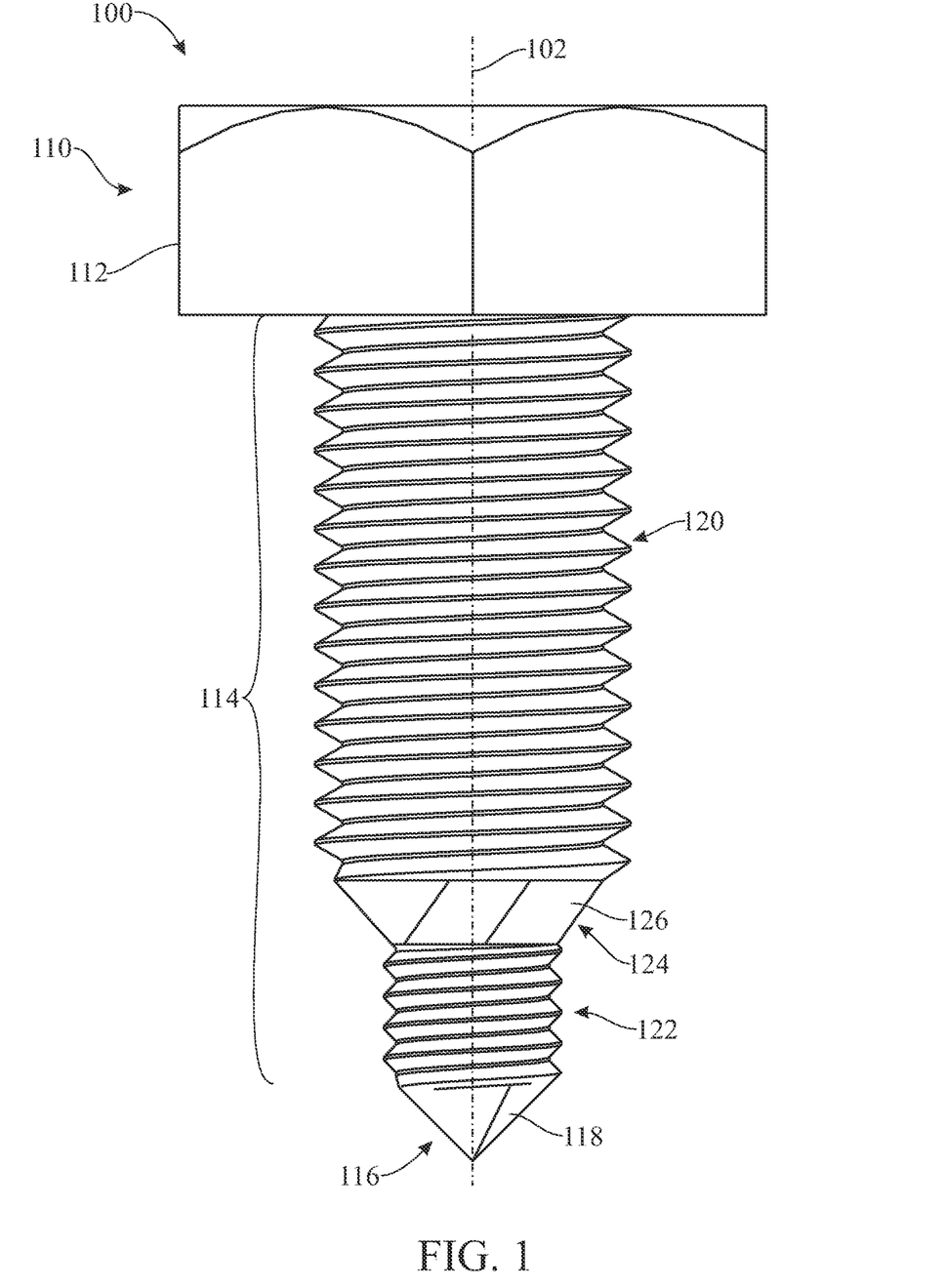
FIG. 1 presents a side elevation view of a self-tapping screw in accordance with a first illustrative embodiment of the present invention.

Referring initially to FIG. 1, a fastener 100 that is formed as a self-tapping screw 110 is illustrated in accordance with an exemplary embodiment of the present invention. As shown, the self-tapping screw 110 includes a head 112, a body portion 114 and a cutting apex, tip portion or tip 116. The body portion 114 may be considered to extend from the head 112 to the cutting tip 116 along a central longitudinal axis 102 of the self-tapping screw 110. The cutting tip 116 may include one or more cutting elements, such as a first cutting surface 118, configured to form or drill an opening in a structure. The body portion 114 of the present embodiment includes a proximal threaded portion 120, a distal threaded portion 122 and an intermediate portion 124 arranged between the proximal threaded portion 120 and the distal threaded portion 122.

Figure 2:
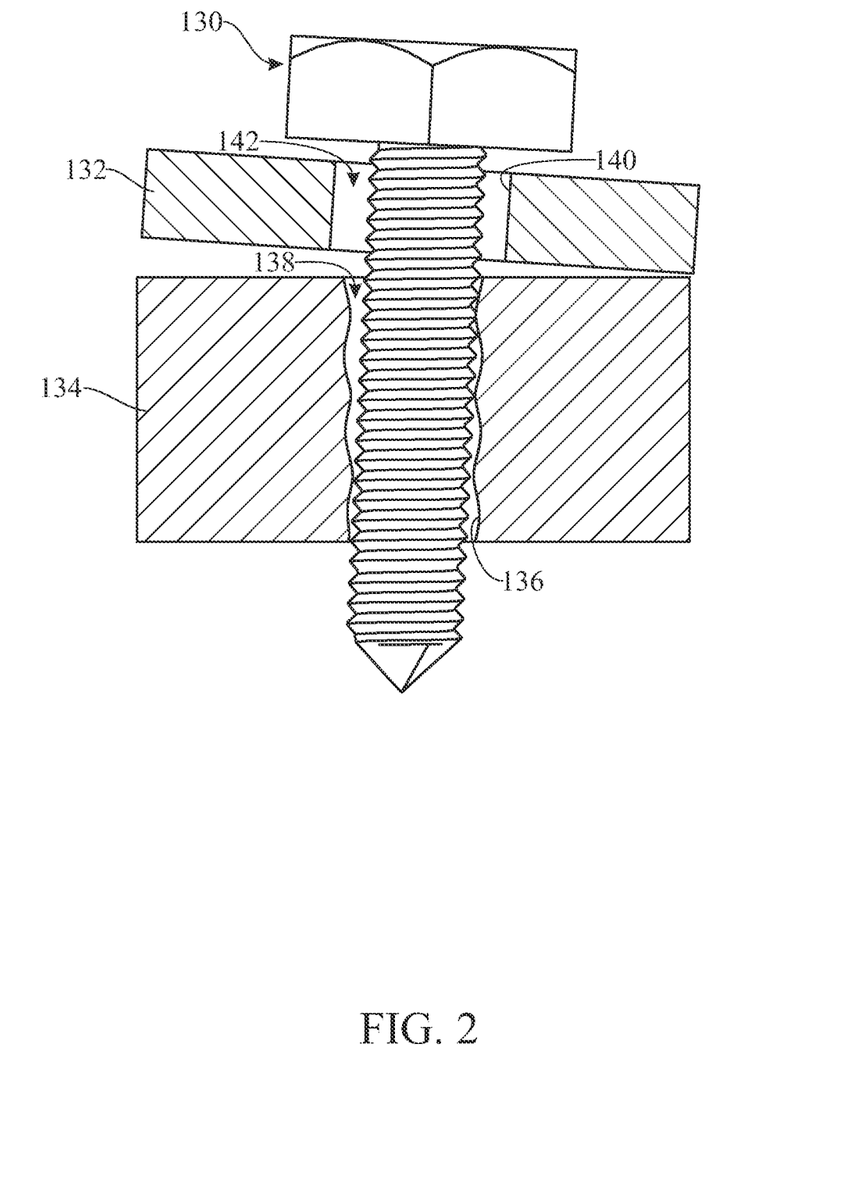
FIG. 2 presents a side elevation view of a conventional self-tapping screw being used to attempt to fasten a first structure to a second structure in which there is a worn-out threaded cavity.

Referring now briefly to FIG. 2, a conventional screw 130 is shown being used to attempt to fasten a first structure 132 (e.g., shutter) to a second structure 134 (e.g., wood wall structure). The second structure 134 includes a cavity 138 defined by an inner wall surface 136. The cavity 138 may be a worn-out threaded cavity, such as, but not limited to, a threaded cavity made by a readily available, conventional screw 130, such as, but not limited to, a #14 screw. The first structure 132 may be a replacement structure (e.g., replacement shutter) and may a through-hole 142 defined by an inner, wall surface 140. As shown, the conventional screw 130 is being used to attempt to attach the replacement structure 132 to the second structure 134. Because the pre-existing cavity 138 is a worn-out threaded cavity having, for example, a diameter larger than a diameter of the original threaded cavity, the conventional screw 130 (which was of the same size used to attach the original shutter) can no longer be used to securely fasten the replacement structure 132 to the second structure 134. Stated another way, the conventional screw 130 can no longer attach to the wall surface 136 defining the worn-out cavity 138 because of the enlarged diameter of the worn-out threaded cavity 138. Unfortunately, wider screws, such as a #16 screw, may not be readily or commercially available. Thus, the replacement structure 132 and worn out, second structure 134 may not be able to be attached to one another using conventional screws. As will be described hereinafter, some embodiments of the fastener in accordance with present disclosure may provide for a self-tapping screw 110 that is capable of tightly fastening the first structure 132 to the second structure 134, even with an enlarged, worn out threaded cavity.

Figure 3:
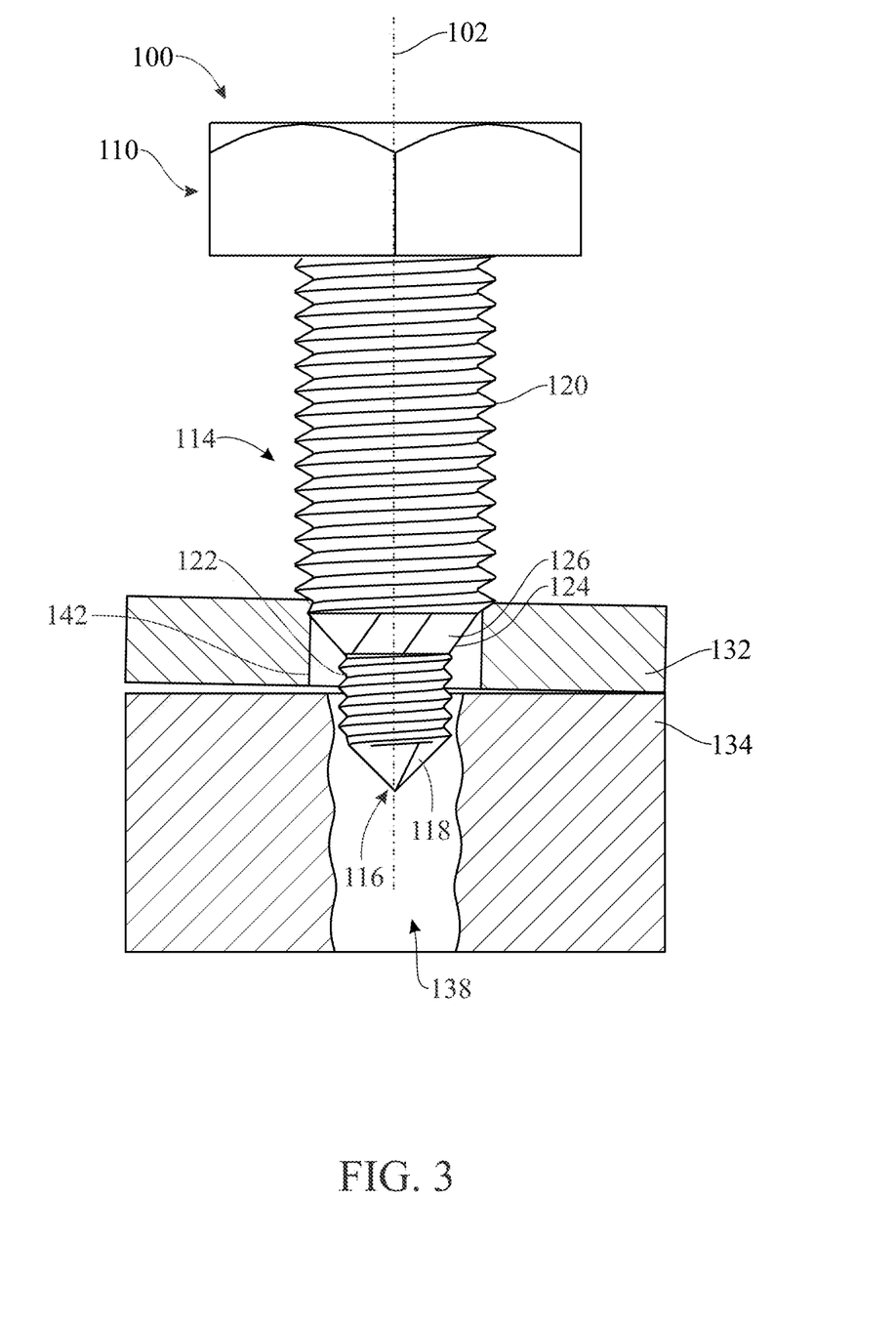
FIG. 3 presents a side elevation view of the self-tapping screw of FIG. 1 being used to fasten the structures introduced in FIG. 2 in accordance with the first illustrative embodiment of the present invention.
Figure 4:
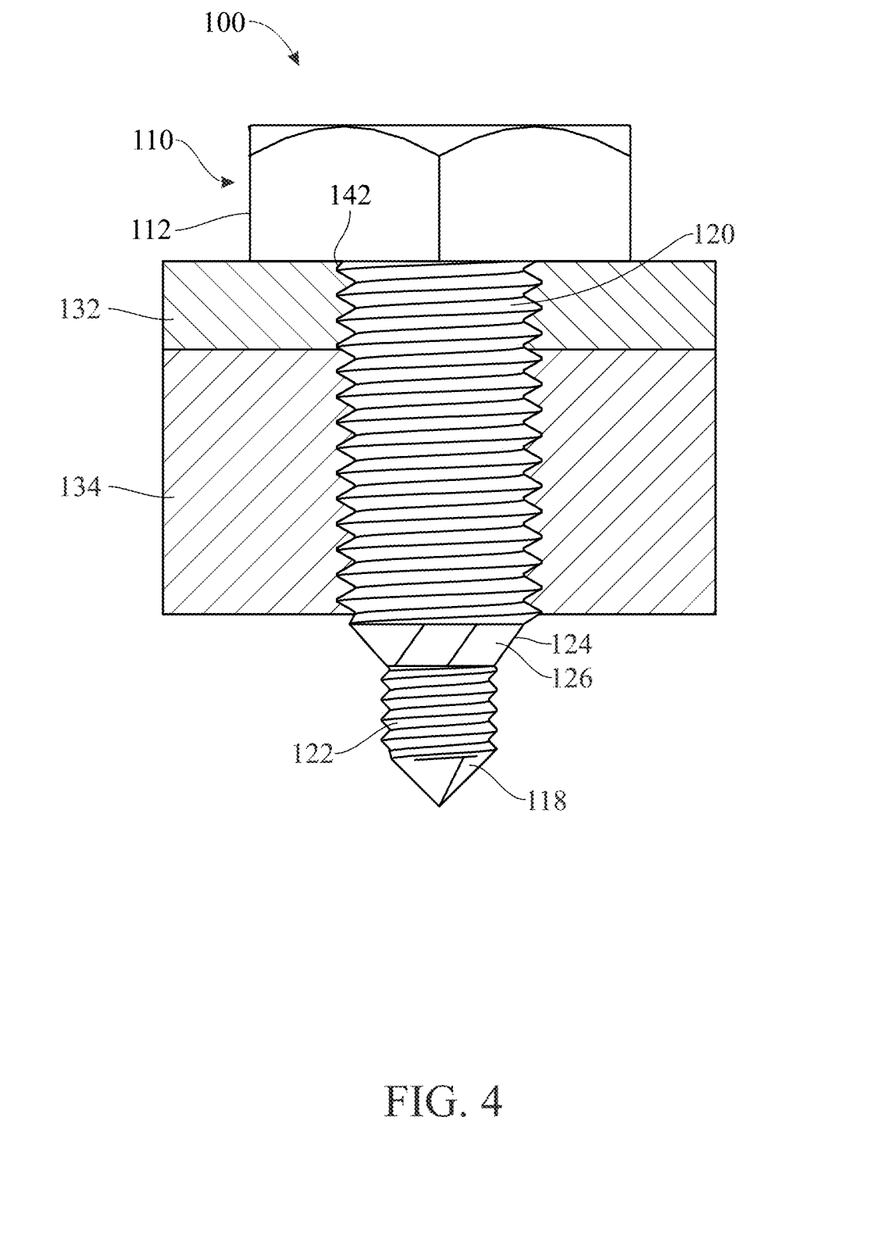
FIG. 4 presents a side elevation view of the self-tapping screw of FIG. 1 securing the structures introduced in FIG. 2 in accordance with the first illustrative embodiment of the present invention.

Referring now primarily to FIGS. 1, 3 and 4, a first illustrative use of the present invention is shown to tightly fasten the first structure 132 to the second structure 134 introduced in FIG. 2, without at least some of the drawbacks of the conventional screw 130.

The illustration of FIG. 3 shows the cutting tip 116 initially penetrating the deteriorated pre-existing cavity 138. The cutting tip 116 and the body portion 114 may be sized and/or configured to align the through-hole 142 in the replacement structure 132 to the pre-existing cavity 138 of the second structure 134. The cutting tip 116 may include a sharp tip at a terminating end of the cutting tip 116. The cutting tip 116 and/or the distal threaded portion 122 may be self-tapping, allowing the cutting tip 116 and/or distal threaded portion 122 to tap a hole as they are driven into a solid or narrower surface, so that the distal threaded portion 122 can thread into said hole. Said self-tapping surface(s) may include a flute or a cutting edge. Said self-tapping surface(s) may be a thread-forming surface or a self-cutting surface. The first cutting surface 118 of the cutting tip 116 may be a tapered cutting surface. In some embodiments, the first cutting surface 118 of the cutting tip 116 may be considered to extend from an end of the distal threaded portion 122 along the central longitudinal axis 102 of the screw 110 to a terminating tip end of the cutting tip 116. In some embodiments, the first cutting surface 118 of the cutting tip 116 may have a conical shape. The conical shape of the first cutting surface 118 may have a diameter that is less than a diameter of a conical shape of the intermediate portion 124. In other embodiments, the first cutting surface 118 may be formed as other shapes.

The intermediate portion 124 may be a non-threaded portion, as shown, and may include one or more cutting surfaces 126 such that the intermediate portion 124 defines a non-threaded, cutting surface or cutting portion of the body portion 114. In some embodiments, the intermediate portion 124 may be considered to extend from the proximal threaded portion 120 along the central axis to the distal threaded portion 122. More specifically, in some embodiments, the intermediate portion 124 may extend from a terminating end of the proximal threaded portion 120 along the central longitudinal axis 102 to a terminating end of the distal threaded portion 122. In some embodiments, the intermediate portion 124 of the body portion 114 may have a conical shape, and, more specifically, in some embodiments, may be shaped as a conical frustum. The conical shape of the intermediate portion 124 may have a diameter that is greater than a diameter of a conical shape of the first cutting surface 118. In other embodiments, the intermediate portion 124 may be formed as other shapes. Similar to the first cutting surface 118 and/or distal threaded portion 122, the intermediate portion 124 and/or proximal threaded portion 120 may also be a cutting surface allowing to cut a hole into which the proximal threaded portion 120 can thread. The cutting surface may include a flute or a cutting edge. In different embodiments, the cutting surface may be a thread-forming surface or a self-cutting surface. In some embodiments, the intermediate portion 124 may be a tapered cutting surface.

The illustration of FIG. 4, which is a continuation of the illustrative use of the self-tapping screw 110 depicted in FIG. 3, shows that (as the screw 110 is driven further into the structures 132, 134) the intermediate portion 124 (having a greater diameter than the first cutting surface 118) is able to widen the worn-out, pre-existing cavity 138 in the second structure 134. In a further embodiment, the proximal threaded portion 120 (which may be wider than the distal threaded portion 122) is able to thread tightly into the cavity 138 for a secure attachment in to the second structure 134. The cavity 138 is formed, by the self-tapping screw 110, into a wider, threaded cavity than the original, pre-existing narrow cavity size. In a preferred embodiment, the proximal threaded portion 120 includes a diameter that is greater than a diameter of the distal threaded portion 122. In a further embodiment, the proximal threaded portion 120 includes a major or outer diameter that is greater than a major or outer diameter of the distal threaded portion 122. In some embodiments, the proximal threaded portion 120 includes a thread size that is larger than a thread size of the conventional screw 130. In some embodiments, the proximal threaded portion 120 includes a thread size that corresponds to a #16 screw thread size. In some embodiments, the proximal threaded portion 120 includes a thread size that corresponds to a #18 screw thread size. In other embodiments, the proximal threaded portion 120 includes other screw thread sizes, yet should preferably be of a screw thread size that is larger than a screw thread size of the distal threaded portion 122 so as to be able to tightly attach to a worn-out threaded cavity.

In some embodiments, the distal threaded portion 122 may include a thread size that corresponds to the thread size of the conventional screw 130 (as shown in FIG. 2), such as, but not limited to, a #14 screw thread size. In other embodiments, the distal threaded portion 122 includes other screw thread sizes, yet should preferably be of a screw thread size that is smaller than a screw thread size of the proximal threaded portion 120. The distal threaded portion 122 may include a major diameter that is less than a major diameter of the proximal threaded portion 120.

It should be understood that the numbering system of the screw sizes is according to a number system known in the art according to one or more standardization bodies (e.g., UNC, UNF, ENEF, UTS, etc.) that define dimensions, arrangements and designations for fasteners and threads. The number of the screw (e.g., #14, #16, #18, etc.) may define at least a diameter, such as a major diameter of a thread, where a larger number means a larger major diameter of the thread and a smaller number means a smaller major diameter of the thread.

The proximal threaded portion 120 is disposed between the head 112 and the intermediate portion 124 of the body portion 114. In some embodiments, the proximal threaded portion 120 may be considered to extend from the head 112 along the central longitudinal axis 102 of the screw 110 to the intermediate portion 124. The proximal threaded portion 120 includes threads that may be disposed in a helical arrangement on a cylindrical body; i.e., the proximal threaded portion 120 may be a cylindrical threaded portion, as shown.

The distal threaded portion 122 is disposed between the intermediate portion 124 of the body portion 114 and the first cutting surface 118 of the cutting tip 116. In some embodiments, the distal threaded portion 122 may be considered to extend from the intermediate portion 124 along the central axis to the first cutting surface 118. The distal threaded portion 122 includes threads that may be disposed in a helical arrangement on a cylindrical body; i.e., the distal threaded portion 122 may be a cylindrical threaded portion, as shown. In some embodiments, the thread density and/or thread pitch of the distal threaded portion 122 may be different from a thread density and/or thread pitch of the proximal threaded portion 120. In other embodiments, the thread density and/or thread pitch of the distal threaded portion 122 may be the same as the thread density and/or thread pitch of the proximal threaded portion 120.

In some embodiments, a length (which may be a longitudinal length along e.g., the central longitudinal axis 102) of the distal threaded portion 122 is shorter than a length of the proximal threaded portion 120. The length of the distal threaded portion 122 may be configured to provide sufficient threads to pull the screw 110 through and/or center the through-hole 142 of the replacement structure 132 with the pre-existing cavity 138 in the second structure 134 (see, for example, FIG. 3 as compared to the misalignment in FIG. 2 with the conventional screw 120). In some embodiments, the length of the distal threaded portion 122 is within a range of between 0.125 and 0.375 inches.

The head 112 may be sized and configured to allow a torque-applying tool to apply a torque to the head 112. More particularly, in some embodiments, the head 112 may include at least one of a cavity and a protrusion sized and shaped to allow a torque to be applied to the head 112 for e.g., screwing and unscrewing/removal of the self-tapping screw 110 from a substrate. In some embodiments, the head 112 is shaped as a hexagonal shape. In another embodiment, the head 112 is shaped as a Phillips screw head. In yet another embodiment, the head 112 is shaped and configured as a slotted screw head. In yet other embodiments, the head 112 is shaped and configured as yet other types of screw heads.

The self-tapping screw 110 may be made of a material having a hardness that allows the tip and threads to penetrate and screw into an intended substrate (e.g., wood, plastic, drywall, etc.). In some embodiments, the self-tapping screw 110 may be made of a metallic material. In some embodiments, the self-tapping screw 110 is made of a stainless-steel material. In other embodiments, the self-tapping screw 110 is made of another hard material.

Figure 5:
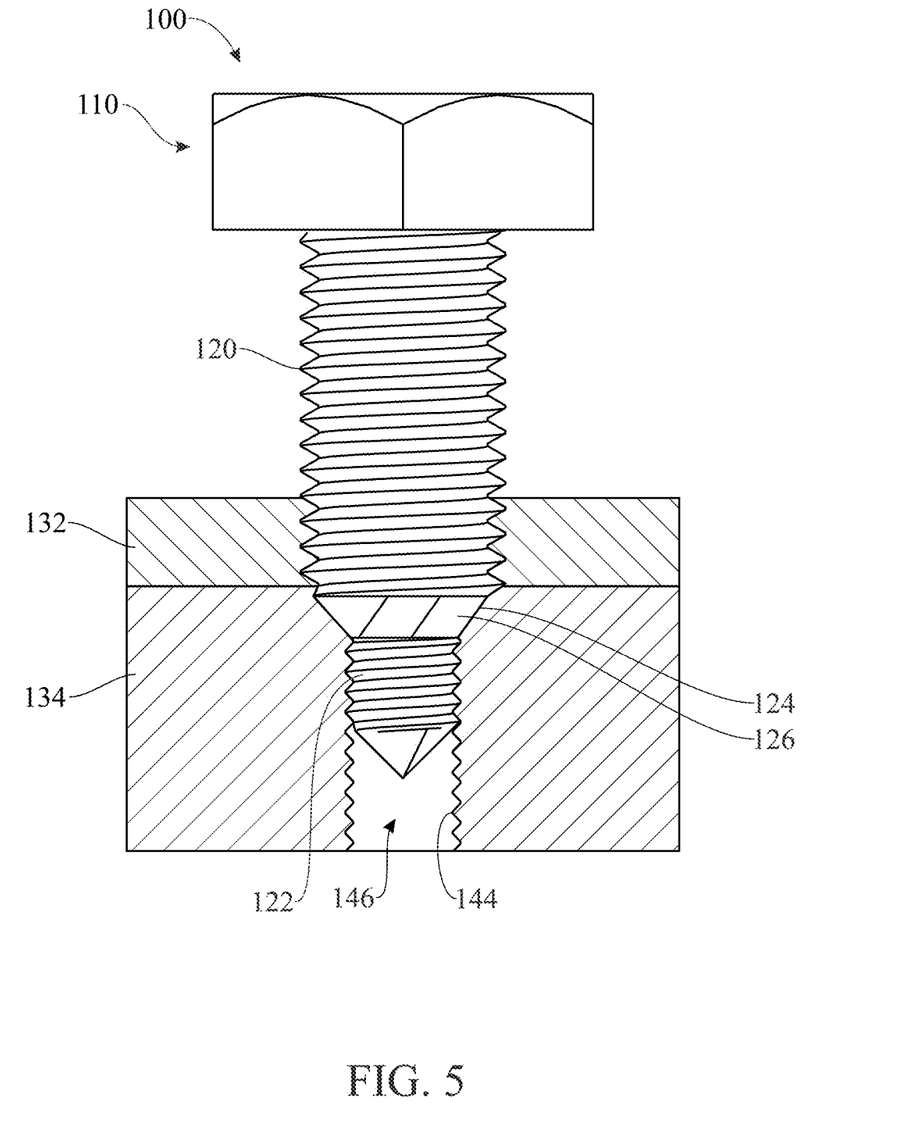
FIG. 5 presents a side elevation view of the self-tapping screw of FIG. 1 being used to fasten the structures introduced in FIG. 2 in accordance with a second illustrative embodiment of the present invention.

Referring now primarily to FIG. 5, a second illustrative use of the present invention is shown to thread into a wall surface 144 defining a narrow, non-deteriorated cavity 146. The narrow, distal threaded portion 122 initially threads into the narrow cavity 146 and "pulls" the rest of the self-tapping screw 110 into the structures 132 and 134. The intermediate portion 124 of the body portion 120 then cuts into the wall surface 144 that defines the non-deteriorated cavity 146 and widens the cavity 146. The wider, proximal threaded portion 120 is then able to thread into the wall surface 144 of the widened, cavity 146 resulting in a secure attachment of the structures 132, 134, such as shown in FIG. 4, for example, even with a non-deteriorated cavity 146.

Figure 6:
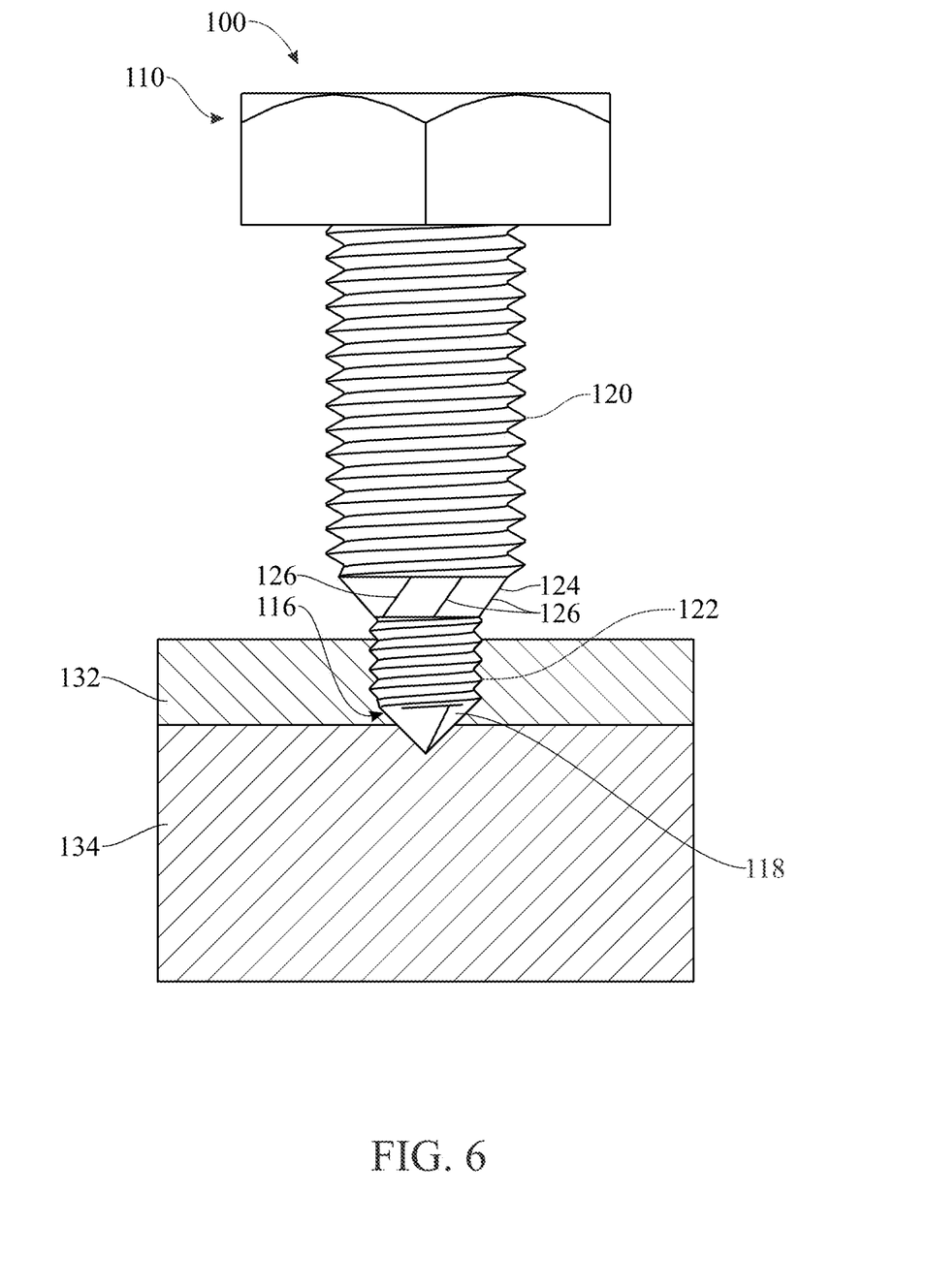
FIG. 6 presents a side elevation view of the self-tapping screw of FIG. 1 being used to perforate holes into the structures introduced in FIG. 2 in accordance with a third illustrative embodiment of the present invention.
Figure 7:
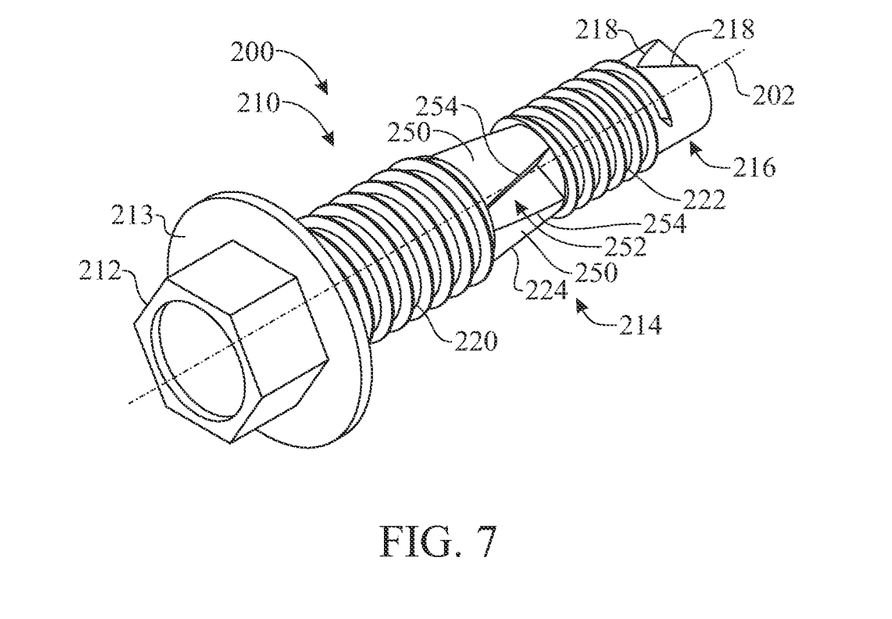
FIG. 7 presents an isometric view of a self-tapping screw in accordance with another illustrative embodiment of the invention.
Figure 8:
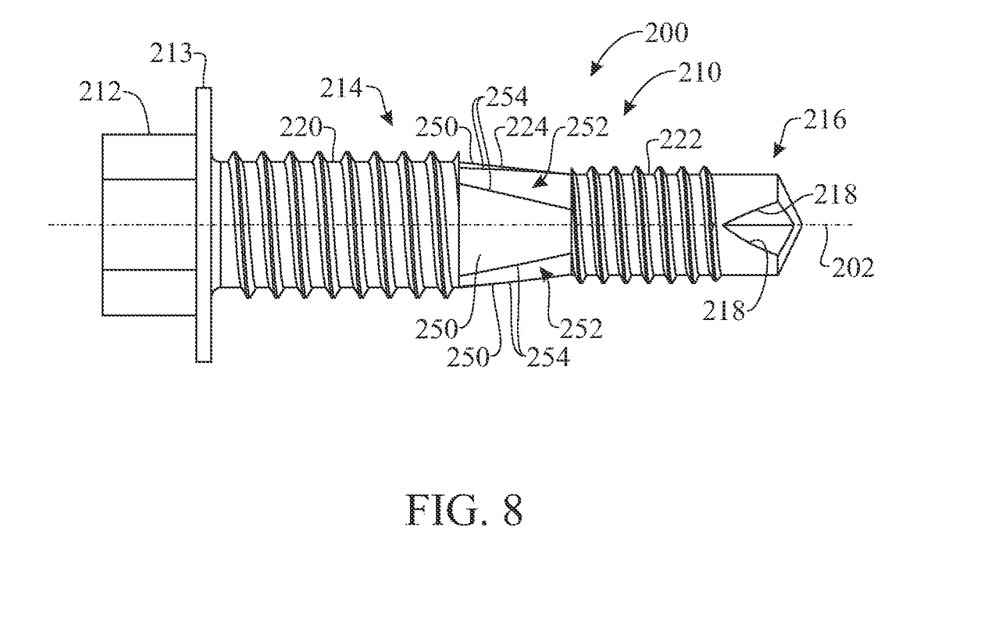
FIG. 8 presents a side elevation view of the self-tapping screw of FIG. 7.

Referring now primarily to FIG. 6, a third illustrative use of the present invention is shown to perforate holes into the structures 132 and 134 (in an embodiment in which the screw 110 is screwed into a portion of the structures 132 and 134 that do not have a pre-existing receiving cavity) via the cutting tip 116 and the cutting surfaces 118 and 124. The first cutting surface 118 of the cutting tip 116 may be a self-tapping surface and may be used to tap a thread into the structures 132 and 134. The distal threaded portion 122 may be driven or drilled into the structures 132 and 134 thereby creating a threaded cavity. The wider, intermediate portion 124 may widen the initial threaded cavity that was made by the distal threaded portion 122. The wider, proximal threaded portion 120 may then be driven into the structures 132 and 134 attaching via the widened, threaded cavity.

The illustrations of FIGS. 7-10 show a self-tapping fastener 200 in accordance with a further embodiment of the invention. Similarly to the previous embodiment, the self-tapping fastener 200 includes a self-tapping screw 210 comprising a head 212, and a body portion 214. The head 212 is configured to allow a torque-applying tool to apply a torque on the head 212 to drive the self-tapping screw 210 for rotation. For instance, the head 212 may be hexagonal, as shown, a slotted crew head, Phillips screw head, and/or other applicable head or combinations thereof. In the present embodiment, the head 212 comprises an integrated or integrally-formed washer 213. The body portion 214 is arranged distally of the head 212 and is elongately formed along a longitudinal direction about a central longitudinal axis 202. Also similarly to the previous embodiment, the body portion 214 includes a proximal threaded portion 220, a distal threaded portion 222, and an intermediate portion 224 disposed between the proximal threaded portion 220 and the distal threaded portion 222. The proximal threaded portion 220 has a first diameter or first outer diameter of the thread, and the distal threaded portion 222 has a second diameter or second outer diameter of the thread. In some embodiments, such as the present embodiment, the second diameter is smaller than the first diameter. The self-tapping screw 210 further includes a cutting tip 216, arranged distally of the body portion 214 and comprising at least one cutting surface configured to form or drill a hole in a structure, similarly to the previous embodiment. However, while the cutting tip 116 described with reference to the previous embodiment was conical, the present cutting tip 216 is instead formed as a self-drilling tip or drilling tip, as shown, provided with cutting edges or surfaces 218.

Similarly to the previous embodiment, the intermediate portion 224 is non-threaded, and includes at least one cutting surface for enlarging a hole in a structure; more specifically, the intermediate portion 224 of the present embodiment comprises a set of longitudinal cutting ribs or protrusions 250 formed about the central longitudinal axis 202 and extending longitudinally along the intermediate portion 224. The longitudinal cutting protrusions 250 may be separated by longitudinal gaps or recesses 252. The longitudinal cutting protrusions 250 may end in cutting surfaces or edges 254. In some embodiments, such as the present embodiment, the cutting edges 254 may be oblique (non-parallel) relative to the central longitudinal axis 202 of the body portion 214; however, alternative embodiments are contemplated in which one or more of the cutting edges 254 may be formed in the longitudinal direction (i.e. parallel to the central longitudinal axis 202).

As in the previous embodiment, the proximal threaded portion 220 of the body portion 214 is a cylindrical threaded portion and the distal threaded portion 222 of the body portion 214 is a cylindrical threaded portion. In some embodiments, the proximal threaded portion 220 may have a proximal thread size, and the distal threaded portion 222 may have a distal thread size, wherein the distal thread size is smaller than the proximal thread size. The intermediate portion 224 is conical, transitioning from the wider, proximal threaded portion 220 to the narrower, distal threaded portion 222. In some embodiments, as shown, the body portion 214 extends from a distal end of the head 212; more specifically, in the present embodiment, the proximal threaded portion 220 of the body portion 214 extends from the distal end of the head 212. In turn, the intermediate portion 224 may extend from a distal end of the proximal threaded portion 220, and may extend to a proximal end of the distal threaded portion 222. As further shown, the cutting tip 216 may extend from a distal end of the body portion 214, and more specifically, may extend from a distal end of the distal threaded portion 222 of the body portion 214.

Also similarly to the previous depicted embodiment, the proximal threaded portion 220 may be longer (i.e. have a greater a dimension along the longitudinal direction) than the distal threaded portion 222. Alternatively or additionally, and preferably additionally, the proximal threaded portion 220 may be longer than the intermediate portion 224. Alternatively or additionally, and preferably additionally, the distal threaded portion 222 may be longer than the intermediate portion 224.

Figure 9:
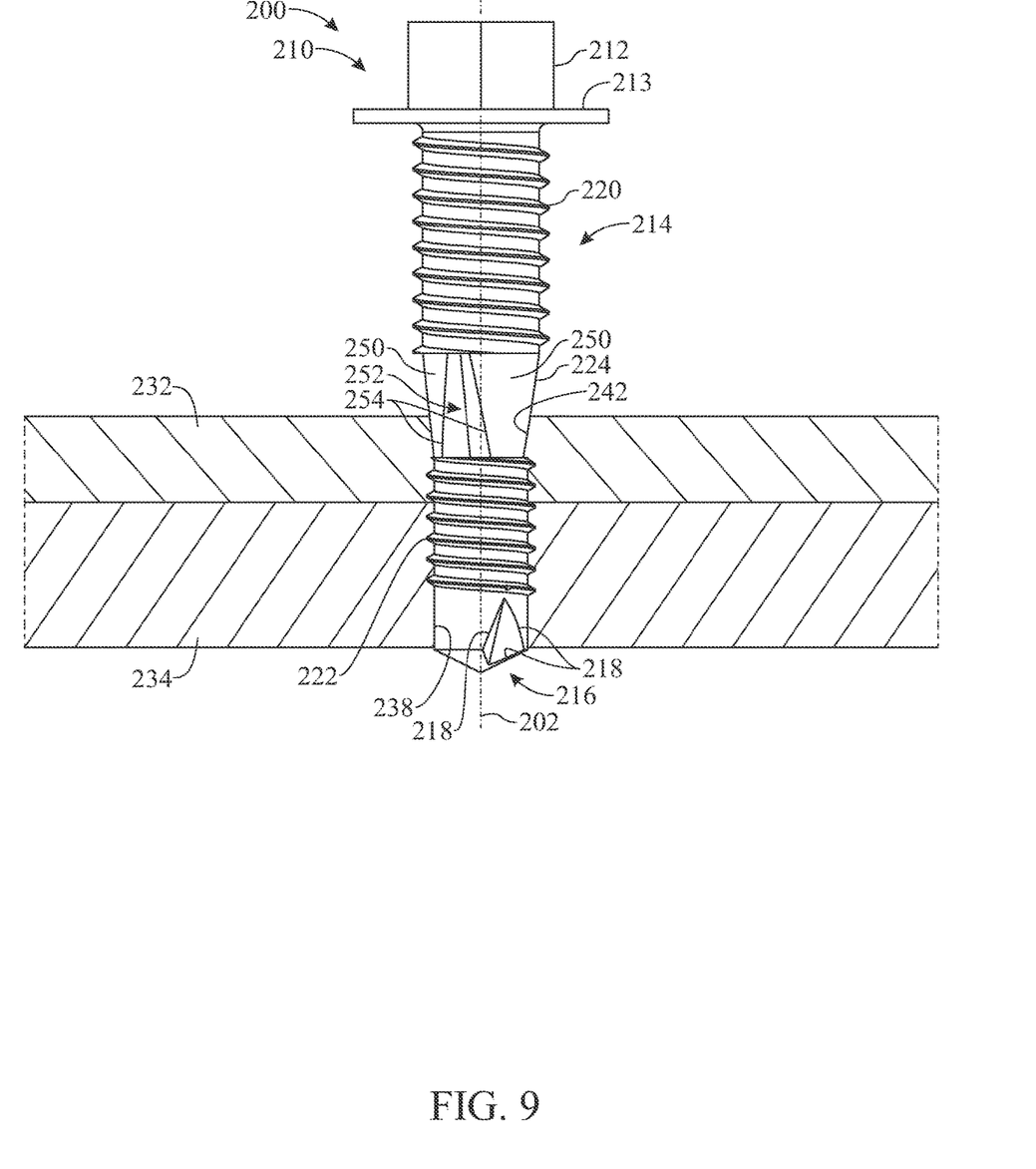
FIG. 9 presents a side elevation view of the self-tapping screw of FIG. 7, the self-tapping screw being used to fasten two structures.
Figure 10:
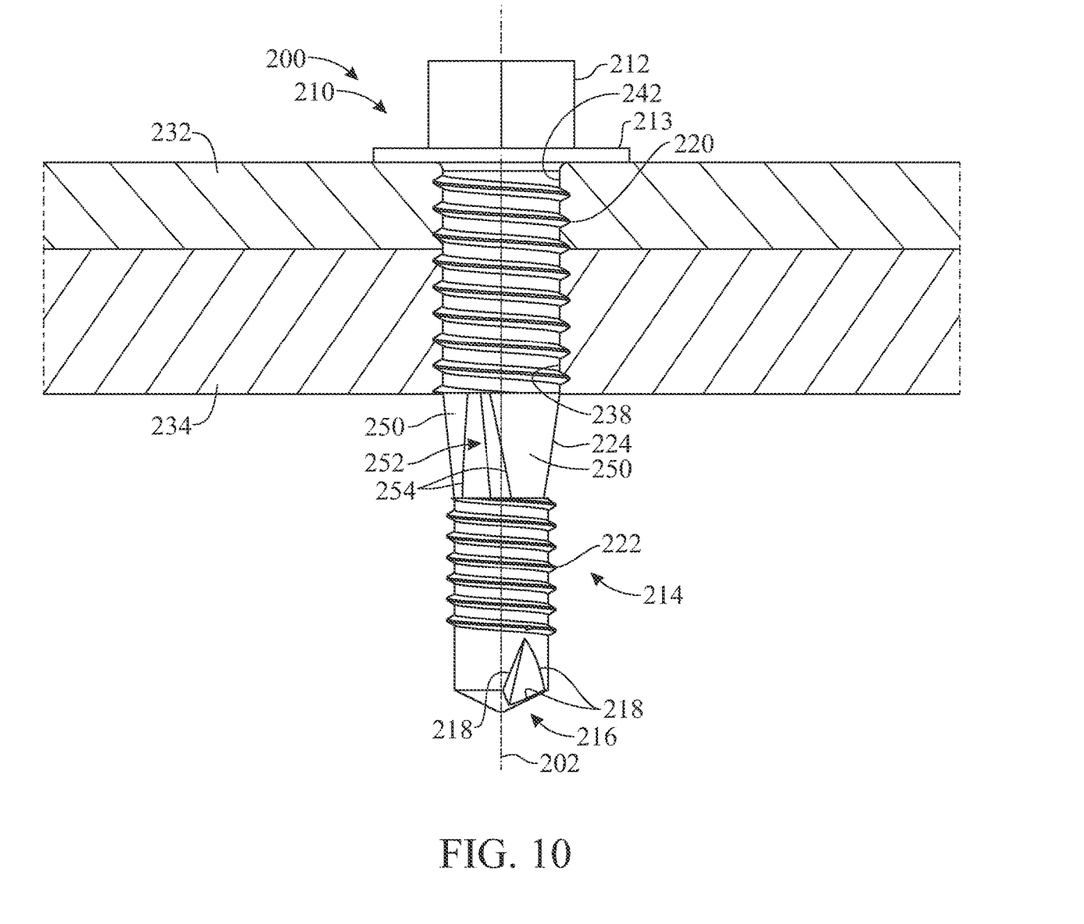
FIG. 10 presents a side elevation view, similar to FIG. 9, with the self-tapping screw shown securing the two structures to one another.

The illustrations of FIGS. 9 and 10 show an example of use of the fastener 200. As shown, the fastener 200 may be used to connect a first structure 232 to a second structure 234, where the structures 232 and 234 lack any openings or pre-drilled holes. As the cutting tip 216 is placed against an outer surface of the first structure 232, a torque-applying tool may drive the fastener 200 to rotate about the central longitudinal axis 202. Rotation of the fastener 200 may cause the cutting tip 216 to cut, drill or form a first opening 242 through the first structure 232 as the fastener 200 is advanced forward and into the first structure 232. Eventually, the self-tapping, distal threaded portion 222 penetrates the first opening 242 and forms a mating thread in the first opening 242 which threads to the distal threaded portion 222. As the fastener 200 advances forward, the cutting tip 216 then cuts, drills or forms a second opening 238 in the second structure 234, and the distal threaded portion 222 follows, penetrating the second opening 238 and forms a mating thread in the second opening 238 which threads to the distal threaded portion 222. As the fastener 200 advances, the intermediate portion 224 drills the first and second structures 232 and 234 to widen the openings 242 and 238, respectively, and the proximal threaded portion 220 then follows, penetrating the first opening 242 and, eventually, the second opening 238, as shown in FIG. 10, and forms mating threads in the first and second openings 242 and 238 which threads to the proximal threaded portion 220. Drilling of the fastener 200 into the initial first and second structures 232 and 234 is facilitated by the fact that the cutting tip 216 is able to open or drill an initial opening in each of the structures, and by the fact that the distal threaded portion 222 is relatively narrow, and the wider, proximal threaded portion 220 threads into and only widens an already-formed cavity (previously formed by the relatively narrower, distal threaded portion 222). It must be noted that, while not specifically shown, the fastener 200 of FIGS. 7-10 may also be used in the examples of used described with reference to fastener 100.

The self-tapping screw 210 may be made of a material having a hardness that allows the tip and threads to penetrate and screw into an intended substrate (e.g., wood, plastic, drywall, etc.). In some embodiments, the self-tapping screw 210 may be made of a metallic material. In some embodiments, the self-tapping screw 210 is made of a stainless-steel material. In other embodiments, the self-tapping screw 210 is made of another hard material.

Alternative embodiments are contemplated in addition to the embodiments shown and/or described herein, which are exemplary.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A self-tapping fastener comprising:
  a head having a first diameter, configured to allow a torque-applying tool to apply a torque on the head to drive the self-tapping fastener for rotation;
  a body portion, arranged distally of the head and elongately formed along a longitudinal direction, the body portion comprising:
    a cylindrical proximal threaded portion having a second diameter,
    a non-threaded intermediate portion, the non-threaded intermediate portion having a cutting edge that extends from a distal end of the proximal threaded portion to a cylindrical distal threaded portion, the non-threaded intermediate portion having a third diameter, the third diameter being smaller than the first diameter, wherein the cylindrical distal threaded portion extends from a distal end of the cutting edge of the non-threaded intermediate portion, the cylindrical distal threaded portion having a fourth diameter, the fourth diameter being smaller than the second diameter, and a cutting tip, arranged distally of the body portion and comprising at least one cutting surface.

2. The self-tapping fastener of claim 1, wherein the intermediate portion is conical.

3. The self-tapping fastener of claim 1, wherein the body portion extends from a distal end of the head.

4. The self-tapping fastener of claim 3, wherein the proximal threaded portion of the body portion extends from the distal end of the head.

5. The self-tapping fastener of claim 1, wherein the intermediate portion extends from a distal end of the proximal threaded portion.

6. The self-tapping fastener of claim 1, wherein the intermediate portion extends to a proximal end of the distal threaded portion.

7. The self-tapping fastener of claim 1, wherein the cutting tip extends from a distal end of the body portion.

8. The self-tapping fastener of claim 7, wherein the cutting tip extends from a distal end of the distal threaded portion of the body portion.

9. The self-tapping fastener of claim 1, wherein the cutting tip is conical.

10. The self-tapping fastener of claim 1, wherein the cutting tip is a drilling tip.

11. The self-tapping fastener of claim 1, wherein the proximal threaded portion has a proximal thread size, and the distal threaded portion has a distal thread size which is smaller than the proximal thread size.

12. The self-tapping fastener of claim 1, wherein the proximal threaded portion has a dimension along said longitudinal direction which is greater than a dimension of the distal threaded portion along said longitudinal direction.

13. The self-tapping fastener of claim 1, wherein the proximal threaded portion has a dimension along said longitudinal direction which is greater than a dimension of the intermediate portion along said longitudinal direction.

14. The self-tapping fastener of claim 1, wherein the intermediate portion has a dimension along said longitudinal direction which is less than a dimension of the distal threaded portion along said longitudinal direction.

15. The self-tapping fastener of claim 1, wherein the head comprises an integrated washer.

16. A self-tapping fastener comprising:
a head having a first diameter, configured to allow a torque-applying tool to apply a torque on the head to drive the self-tapping fastener for rotation;
a body portion, arranged distally of the head and elongately formed along a longitudinal direction, the body portion comprising:
  a cylindrical proximal threaded portion having a second diameter,
  a non-threaded conical intermediate portion, the non-threaded conical intermediate portion having at least two cutting edges that extends distally from the proximal threaded portion to a cylindrical distal threaded portion, the non-threaded conical intermediate portion having a third diameter, the third diameter being smaller than the first diameter, and the at least two cutting edges being symmetrical about a central longitudinal axis,
  wherein the cylindrical distal threaded portion extends from a distal end of the cutting edge of the non-threaded intermediate portion, the cylindrical distal threaded portion having a fourth diameter, the fourth diameter being smaller than the second diameter, and
a cutting tip, arranged distally of the body portion and comprising at least one cutting surface.

17. A self-tapping fastener comprising:
a head having a first diameter, configured to allow a torque-applying tool to apply a torque on the head to drive the self-tapping fastener for rotation;
a body portion, arranged distally of the head and elongately formed along a longitudinal direction, the body portion comprising:
  a cylindrical, proximal threaded portion extending from a distal end of the head and having a second diameter, the proximal threaded portion being perpendicular to a central longitudinal axis,
  a non-threaded conical intermediate portion, the non-threaded conical intermediate portion having at least two cutting edges that extends distally from the proximal threaded portion to a cylindrical distal threaded portion, the non-threaded conical intermediate portion having a third diameter, the third diameter being smaller than the first diameter, and the at least two cutting edges being symmetrical about the central longitudinal axis,
  wherein the cylindrical distal threaded portion extends from a distal end of the cutting edge of the non-threaded intermediate portion, the cylindrical distal threaded portion having a fourth diameter, the fourth diameter being smaller than the second diameter, and,
a cutting tip, arranged distally of the body portion and extending from a distal end of the cylindrical distal threaded portion, the cutting tip comprising at least one cutting surface and being self-tapping, such that the cutting tip taps a hole as the cutting tip is driven into a surface.

* * * * *